United States Patent [19]
Shannon et al.

[11] Patent Number: 5,685,998
[45] Date of Patent: Nov. 11, 1997

[54] METHOD OF MINIMIZING DIFFRACTION GROOVE FORMATION ON LASER ETCHED SURFACES

[75] Inventors: John H. Shannon, Hamlin; Kevin J. McIntyre, Rochester, both of N.Y.

[73] Assignee: Bausch & Lomb Incorporated, Rochester, N.Y.

[21] Appl. No.: 611,554

[22] Filed: Mar. 6, 1996

Related U.S. Application Data

[62] Division of Ser. No. 75,704, Jun. 11, 1993, abandoned.

[51] Int. Cl.$^6$ .................................................. B23K 26/00
[52] U.S. Cl. ...................... 219/121.69; 219/121.78; 606/5; 128/303.1
[58] Field of Search ............... 219/121.6, 121.61, 219/121.67, 121.68, 121.69, 121.78; 128/303.1; 156/659.11; 356/355; 437/229; 606/5

[56] References Cited

U.S. PATENT DOCUMENTS

| | | | |
|---|---|---|---|
| 4,414,059 | 11/1983 | Blum et al. | 156/659 |
| 4,732,148 | 3/1988 | L'Esperance | 128/303.1 |
| 4,770,172 | 9/1988 | L'Esperance | 128/303.1 |
| 4,861,964 | 8/1989 | Sinohara | 219/121.68 |
| 4,973,330 | 11/1990 | Azema et al. | 606/5 |
| 5,061,342 | 10/1991 | Jones | 156/643 |
| 5,160,823 | 11/1992 | Bennin et al. | 219/121.68 |
| 5,170,191 | 12/1992 | Jones | 351/160 |
| 5,219,344 | 6/1993 | Yoder | 606/5 |
| 5,296,673 | 3/1994 | Smith | 219/121.68 |

FOREIGN PATENT DOCUMENTS

| | | |
|---|---|---|
| 0 346 116 | 12/1989 | European Pat. Off. . |
| 60-166188 | 8/1985 | Japan . |
| 91/01514 | 2/1991 | WIPO . |
| 91/08723 | 6/1991 | WIPO . |

OTHER PUBLICATIONS

Patent Abstracts of Japan, vol. 10, No. 2 (M-444) (2059) 8 Jan. 1986.

*Primary Examiner*—Tu B. Hoang
*Attorney, Agent, or Firm*—John E. Thomas; Katherine McGuire

[57] ABSTRACT

Laser radiation can be directed through an aperture to a target surface without causing the expected diffraction groove effect by moving the target relative to the stage to which the aperture is attached in such a fashion as to interrupt the diffraction pattern and minimize the production of diffraction grooves.

11 Claims, 2 Drawing Sheets

METHOD OF MINIMIZING DIFFRACTION GROOVE FORMATION ON LASER ETCHED SURFACES

This is a divisional of application Ser. No. 08/075,704 filed on Jun. 11, 1993 abandoned.

FIELD OF THE INVENTION

The present invention relates to the improved methods of laser etching substrates, especially optically clear substrates for uses such as contact lenses.

BACKGROUND OF THE INVENTION

The use of apertures with laser systems in the field of material processing is well known. An aperture is understood to be an object which has an opening through which the laser beam, or a portion of the laser beam, is directed. There are many applications for apertures in the laser processing field.

Apertures may be used to restrict certain portions of the laser beam from reaching the target. For example, the raw beam emitted from an excimer laser does not have a uniform cross-sectional energy distribution across its profile. The "edges" of the beam often have a reduced energy profile as compared with the more central portion of the beam. This is predicted by the characteristic Gaussian distribution along one axis of the raw excimer beam. Therefore, apertures are often used with excimer lasers in an attempt to create a beam of uniform energy distribution.

However, when a laser beam passes through an aperture, the beam undergoes a physical phenomenon known as diffraction. Diffraction is defined as the departure from rectilinear propagation of electromagnetic radiation (light), and its effects can be observed when the bending or deflection of light or other radiation passes an obstacle such as the edge of a slit, or aperture. The diffraction effects may be seen as a series of lines or grooves at or near the edges of the irradiated field; such field being the area bounded by the aperture which is exposed to radiation on the target surface.

Useful applications have been found for the diffraction grooves left by the diffraction effect. The diffraction effects in certain applications are desirable and even necessary. However, when the irradiated substrate must remain optically clear and unaffected by any irregularity, the presence of diffraction grooves is often not desirable. The grooves may impact the lens design, otherwise affect the other aspects of the lens or make production of lenses impossible, since the presence of such diffraction grooves in the optical zone may be unacceptable.

SUMMARY OF THE INVENTION

It has now been discovered, and is disclosed herein that laser radiation in the form of a laser beam can be directed through an aperture to a target surface without causing the expected diffraction groove effect by moving 1) the beam relative to the target, 2) the beam relative to the aperture or 3) the aperture relative to the substrate such that the formation of diffraction grooves on the target surface is minimized.

In one embodiment of the present invention, a method for modifying a target surface is disclosed comprising directing a beam of radiation through an aperture to a target substrate while shifting the beam position on the target surface by a distance such that the formation of diffraction grooves is minimized.

In a further embodiment, a method for modifying a target surface is disclosed comprising directing a beam of radiation through an aperture to a target substrate while moving the aperture relative to target substrate in a predetermined motion at a predetermined velocity such that the formation of diffraction grooves is minimized. The predetermined motion may be a linear oscillating motion, or an off-axis rotational motion.

DETAILED DESCRIPTION OF THE INVENTION

Figure 1:
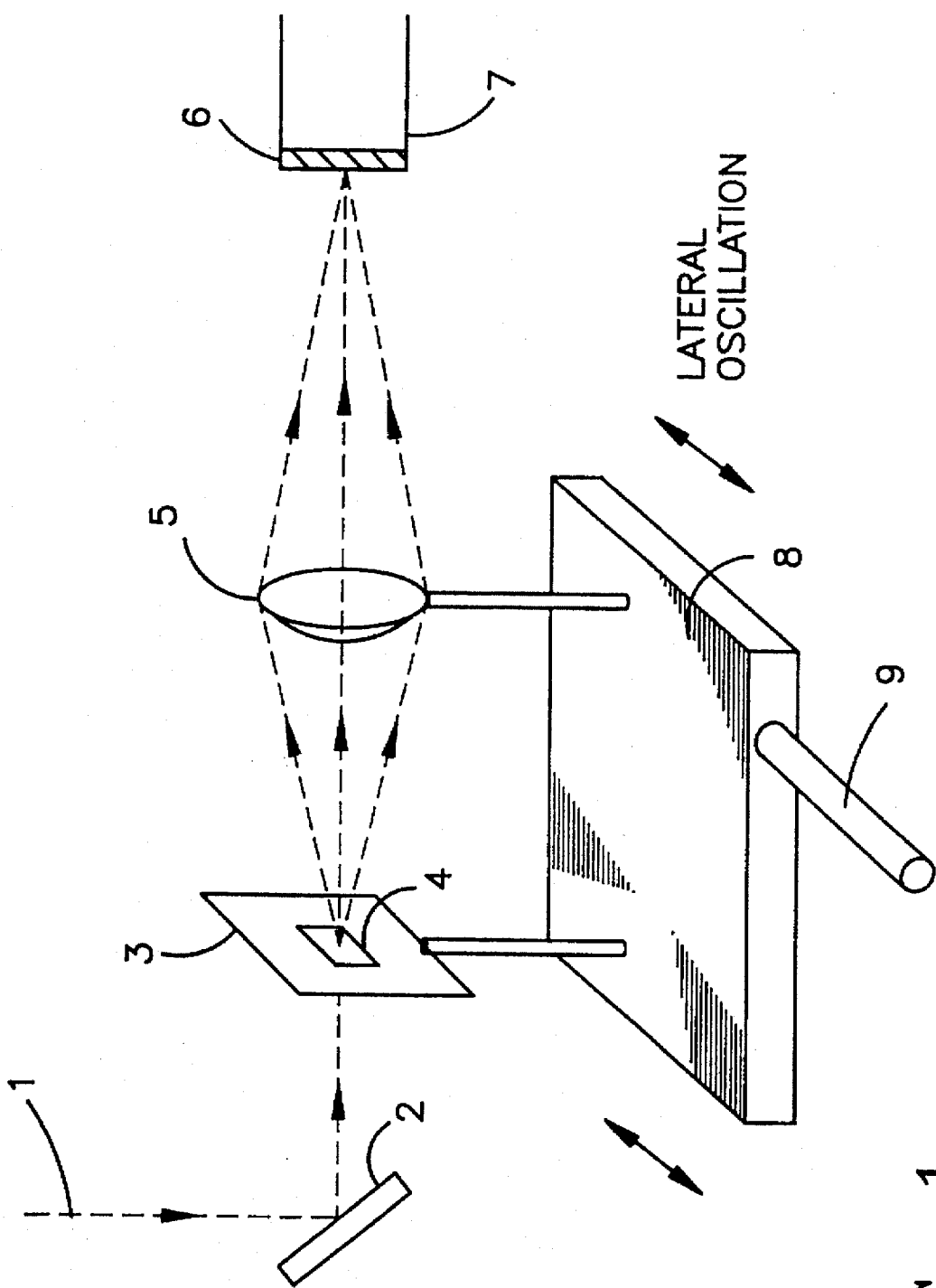
FIG. 1 is a perspective view of a laser assembly with a stage housing an aperture and focusing lens showing the stage being oscillated laterally to minimize formation of diffraction grooves.

In one embodiment of the present invention as shown by FIG. 1, a small aperture is imaged onto a target surface. A laser beam (1) from a laser source (not shown) is directed to a mirror (2) which in turn directs the beam (1) to a rectangular aperture (3) having a small (1.8 mm×1.1 mm) opening (4). The beam (1) then engages a focusing lens (5) and is directed to the target sample (6) which is fixed to a positioning means (7). The aperture (3) and focusing lens (5) are mounted to a stage (8) having a connection (9) to a means (not shown) capable of oscillating the stage in a desired motion, which may be linear, at predetermined and adjustable speeds which can be programmed to work in concert with the scanning motion of the beam.

Figure 2:
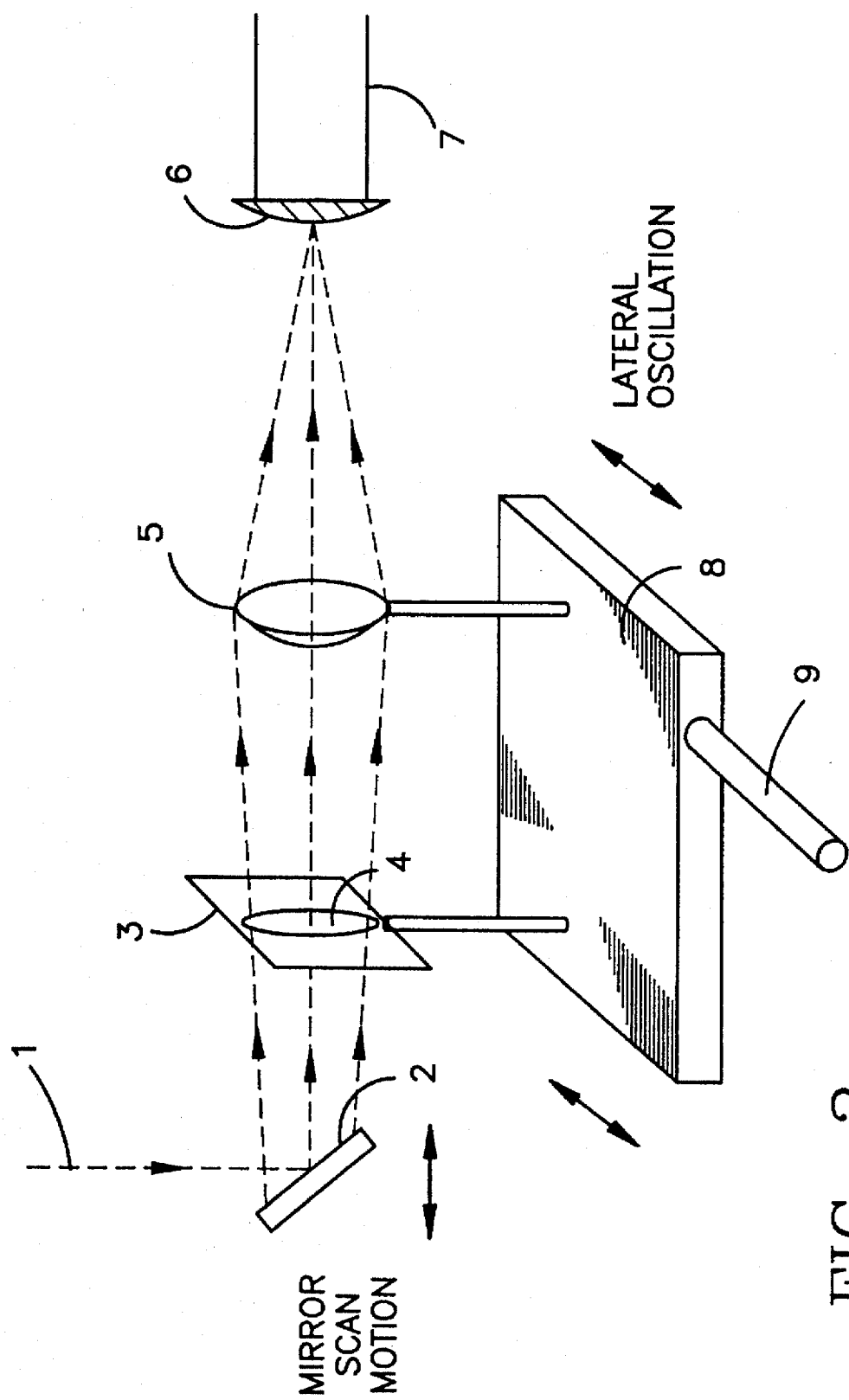
FIG. 2 is a perspective view of a laser assembly with aperture and lens showing the stage being oscillated linearly along with a scanning beam to minimize formation of diffraction grooves.

In a further embodiment of the present invention, as shown by FIG. 2, a beam is directed through an aperture and focusing lens to a contact lens. The laser beam (1) from a laser source (not shown) is directed to a scanning mirror (2) which in turn directs the beam to an aperture (3) having a 20 mm diameter circular opening (4). The beam then proceeds through a focusing lens (5) to a target (6) which is fixed to a positioning means (7). The aperture (3) and the focusing lens (5) are mounted to a stage (8) having a connection (9) to a means (not shown) capable of oscillating the stage in a desired motion which may be linear at predetermined and adjustable speeds.

In either embodiment, as the laser is pulsed, the stage to which the aperture is attached is oscillated in either a linear or non-linear direction. This movement causes a shift in the position of the beam on the target surface leading to a shift of the diffraction groove pattern which would ordinarily begin forming on the target surface. Changing the relative position of the groove pattern formed by each pulse results in the formation of the groove pattern being minimized.

It will be recognized by those skilled in the field that laser/target assemblies could be modified in many ways to achieve the same results. When relative motion between the target and the aperture is required, either the aperture or the target may be moved in relation to one another to minimize the formation of the diffraction grooves. More than one component may move. For example, both the target and the aperture may be moved in a predetermined way to minimize the formation and effect of diffraction grooves.

When a focusing lens is present, the focusing lens may be moved in concert with the aperture, or it may be moved independently and relative to the aperture to achieve the effect of minimizing formation of diffraction grooves.

It is also contemplated that the beam may itself be scanned, or scanned through the use of various moving refractive or reflective optics arrangements relative to the target, as are known to the skilled practitioner in the field, while the aperture is oscillated.

In a further embodiment, the aperture may further be moved non-linearly relative to the target to accomplish the process of the present invention. For example, it is contemplated that the stage holding the aperture and, optionally, the focusing lens may be moved relative to the target in a repeating "S" shaped pattern. It is further contemplated that the target may be moved relative to the beam and/or aperture in many different patterns and shapes, all of which can effectively minimize the formation of diffraction grooves.

In a still further embodiment, the aperture and/or the target may be moved rotationally in relation to one another at an off-center position. In this way, the aperture would predictably move into and out of the path of the pulsed beam, thereby interfering with a number of pulses which would otherwise impact the target surface, shifting the diffraction groove pattern formed by each individual pulse.

It is contemplated that the beam may remain stationary while the aperture oscillates or rotates off-axis. It is also contemplated that the beam may itself be scanned, or scanned through the use of various moving refractive or reflective optics arrangements, as are known to the skilled practitioner in the field, while the aperture is oscillated, or rotated off-axis. As stated previously, the oscillating or off-axis rotational movement occurs relative to the target and the aperture. Therefore, it is contemplated that one or more of the target, the aperture, or the beam move (either as scanned or with the aid of refractive or reflective optics), relative to one another.

It is further contemplated that computer programming which is known to those skilled in the laser scanning field, be attached to the laser set-up as contemplated herein, so that the movement of the aperture and/or the target surface is synchronized in a predetermined way with the pulsing of the laser beam. It is believed that the aperture must only be moved relative to the target very small distances of from about 1 to about 250 micrometers, preferably from about 50 to about 150 micrometers, and more preferably about 100 micrometers, to interrupt and therefore minimize the formation of diffraction grooves.

The following definitions and relationships are set forth to enhance the understanding of the invention.

The aperture also can be broadly thought of as the element which gives rise to groove formation, caused by diffraction, on the target surface.

$V_{aperture}$ is defined to be the uniform linear velocity of the aperture.

D is defined to be the distance between the first peak and the first trough on the groove pattern produced by a single pulse. This can be calculated using diffraction theory or measured directly.

$A_{target}$ is defined to be the maximum range (or amplitude) over which the diffraction pattern on the target is shifted laterally. This quantity is chosen to be greater than or equal to D, defined above.

$A_{aperture}$ is defined to be the maximum range (or amplitude) over which the aperture is translated laterally and in practice its value is calculated from the value of $A_{target}$ as described below:

$A_{aperture}=A_{target}$ if there are not any optical elements between the aperture and the target;

$A_{aperture}=A_{target}$ if there are optical elements between the aperture and the target and these optical elements move with the aperture;

If there are optical elements located between the aperture and the target and such optical elements do not move in concert with the aperture, $A_{target}$ is not necessarily equal to $A_{aperture}$. Accordingly, $A_{aperture}$ must be scaled by a significant factor, $\alpha$, which is determined by the optical system configuration between the aperture and the lens, such that $$A_{target}=\alpha A_{aperture}. \tag{1}$$

A full oscillation is defined as the occurence of moving the aperture from one end of its travel to the other end of its travel and then back to its starting position. The total distance the aperture moves during an oscillation is thus equal to $2A_{aperture}$.

A half oscillation is defined as the occurence of moving the aperture from one end of its travel to the other end of its travel. The total distance the aperture moves during a half oscillation is this equal to $A_{aperture}$.

Therefore, from a theoretical perspective, the purpose of the invention is to uniformly distribute individual groove patterns, arising from each pulse, across a distance, $A_{target}$, on a target. $A_{target}$ should be chosen to be greater than or equal to D. For the case of a half oscillation, an expression as follows can be written for the physical offset between individual groove patterns on the target:

$$d_{target}==\frac{A_{target}}{N}=\alpha\frac{A_{aperture}}{N} \tag{2}$$

where N is the total number of pulses delivered toward the target surface.

This expression can be written in terms of the laser pulse rate and the uniform velocity of the oscillating aperture, $V_{aperture}$ as $$d_{target}=\alpha\frac{V_{aperture}}{R} \tag{3}$$

where R is the laser pulse rate.

By combining the above equations:

$$V_{aperture}=\frac{RA_{target}}{\alpha N} \tag{4}$$

This equation allows one to calculate the speed required to provide a uniform distribution of groove patterns on the target for the case of a half oscillation.

Similar expressions can be derived for the case of multiple oscillations as would be known by those skilled in the field. In some applications, particularly when using large numbers of pulses, precise placement of each groove pattern is not required as shown in the example below. For such cases, the velocity of the aperture can be set at higher rate than that calculated using equation (4) so that the aperture oscillates multiple times while the required number of pulses are delivered to the target independently of the aperture position.

It is understood that many different setups comprising the aperture, the target, additional optical elements and different types of lasers can be arranged to achieve the desired result of minimizing the formation of diffraction grooves. It is therefore contemplated that the present invention can work to minimize the effect of diffraction grooves caused when a continuous wave laser, as opposed to a pulsed laser, is used.

It is further understood that the aperture may itself be able to change its radius automatically in relation to the beam in such a way that diffraction grooves are minimized without having to actually move or oscillate the aperture in the path of the beam.

The present invention is not limited to direct material removal processes such as photoablation. For example, it is thought that the present invention would be particularly useful in photographic systems, electronic imaging systems or as part of a photochemical removal process in which the target is exposed to radiation and subsequently developed in solution.

It is further contemplated that within the scope of the present invention, methods to minimize diffraction grooves could be conceived which use more than one aperture. The aperture may be used for imaging and may be, for example, a small rectangular aperture. The aperture may also be used in a non-imaging system, and therefore may be a system having a 20 mm circular aperture. Further, the aperture may be a "contact mask", in close association with the surface of the target.

It is further understood that uniform relative velocity of any of the optical elements or the beam as scanned is not necessary. Further, intensity, energy and fluence of the beam at the target surface may be varied during processing.

The following examples describe protocols which can be used to determine the parameters for properly impeding the creation of diffraction grooves and serve only to further illustrate aspects of the present invention and should therefore not be construed as limiting the invention.

EXAMPLE

A pulsed beam of ultra violet radiation was directed through an aperture set-up at a dummy target substrate (a hydrophilic contact lens polymer in its nonhydrated state) as shown in FIG. 1 until a diffraction groove pattern became visible. The groove pattern was actually measured using an interferometric surface profiler (Wyko Corp., Tuscon, Ariz.), although the predicted pattern could have been calculated theoretically using standard diffraction analysis techniques. The distance between the first peak and trough was found to be approximately 40 micrometers. This value determined the proper oscillation amplitude and oscillation velocity to be set to overcome the formation of the diffraction grooves. Therefore, for the small rectangular aperture example as shown in FIG. 1:

D=40 micrometers
$A_{target}$=100 micrometers
R=3.3 Hz
α=1
N=60
Substituting these values into equation (4),
$V_{aperture}$=5.5 micrometers/sec.

This means that the aperture must move at a minimum speed of 5.5 micrometers/sec to minimize the diffraction groove pattern at the target surface. In this example, the actual velocity chosen was 33 micrometers/sec. The target surface showed no visible diffraction grooves in the linear direction in which the aperture was moved.

Many other modifications and variations of the present invention are possible to the skilled practitioner in the field in light of the teachings herein. It is therefore understood that, within the scope of the claims, the present invention can be practiced other than as herein specifically described.

I claim:

1. A method of forming an etching of predetermined configuration on a target surface with a laser beam directed through an opening of an aperture, said opening being of predetermined outline, said aperture being positioned between a source of said laser beam and said target surface such that said laser beam is directed to impinge upon said target surface to form said etching, and wherein a portion of said laser beam passing immediately adjacent the perimeter of said opening experiences a diffractive effect which causes an initial formation of a plurality of diffractive grooves having alternating peaks and troughs about the perimeter of said etching on said target surface, the method comprising:

during formation of said etching, changing the positional relationship between said laser beam and said target surface in a first direction substantially transverse to said alternating peaks and troughs, said change in positional relationship being such as to satisfy the condition:

$$A_{target} \geq D$$

wherein $A_{target}$ is the range over which said diffraction pattern is shifted, and D is the distance between the first peak, and the first trough on the groove pattern produced by a single pulse, whereby said formation of diffractive grooves is minimized.

2. The method of claim 1 wherein a focusing lens is placed between said aperture and said target surface and wherethrough said laser beam is directed.

3. The method of claim 1 wherein said aperture is moved relative to said target substrate in a predetermined motion at a predetermined velocity.

4. The method of claim 3 wherein said predetermined motion is an oscillating motion through a distance from 1 to 250 μm.

5. The method of claim 3 wherein said predetermined motion is an off-axis rotational motion.

6. The method of claim 1 wherein said aperture is circular.

7. The method of claim 1 wherein said beam is pulsed.

8. The method of claim 1 wherein said beam is scanned.

9. The method of claim 1 wherein said beam remains stationary relative to said aperture.

10. The method of claim 1 wherein said target substrate is a cornea.

11. The method of claim 1 wherein said target substrate is a contact lens.

* * * * *

UNITED STATES PATENT AND TRADEMARK OFFICE
CERTIFICATE OF CORRECTION

PATENT NO. : 5,685,998
DATED : November 11, 1997
INVENTOR(S) : John H. Shannon, et. al.

It is certified that error appears in the above-identified patent and that said Letters Patent is hereby corrected as shown below:

In column 6, line 19, after "target surface", insert -- defining a diffraction pattern --;

In column 6, lines 23-24, delete ", said change in positional relationship being";

In column 6, line 24, delete "such as";

In column 6, line 32, change "groove pattern" to -- diffractive groove --.

Signed and Sealed this

Thirteenth Day of January, 1998

Attest:

BRUCE LEHMAN

Attesting Officer

Commissioner of Patents and Trademarks